United States Patent [19]  [11] 3,930,051
Kahn  [45] Dec. 30, 1975

[54] METHOD FOR PREPARING A PUDDING

[76] Inventor: Leonard R. Kahn, 70 N. Grove St., Freeport, L.I., N.Y. 11520

[22] Filed: Aug. 13, 1973

[21] Appl. No.: 387,952

Related U.S. Application Data

[63] Continuation-in-part of Ser. No. 200,825, Nov. 22, 1971, abandoned.

[52] U.S. Cl. .................................. 426/573; 426/618
[51] Int. Cl.² ......................................... A23L 1/187
[58] Field of Search ........... 426/142, 167, 350, 618, 426/660

[56] References Cited
UNITED STATES PATENTS
2,418,847  4/1947  Musher .............................. 426/167
3,121,637  2/1964  Clausi et al. ........................ 426/142

*Primary Examiner*—Jeanette M. Hunter

[57] ABSTRACT

A conveniently prepared pudding made by combining suitable oat flakes having a size between 0.1 and 0.7 cm and a specific gravity of 0.3 to approximately 0.7 with a liquid and allowing the resulting mixture to set to form a pudding without cooking or baking the mixture. The pudding has a texture and density of bread pudding.

14 Claims, No Drawings

METHOD FOR PREPARING A PUDDING

RELATED APPLICATION

This application is a continuation-in-part of my application, Ser. No. 200825 titled "Method for Preparing a Pudding" filed Nov. 22, 1971, now abandoned

BACKGROUND OF THE INVENTION

Bread puddings normally take an appreciable amount of time to prepare and a certain degree of expertise. For example; one recipe calls for baking the pudding for 1½ hours and thus the preparation of bread pudding is quite time consuming. Furthermore, the mixing of the bread, eggs, and other ingredients takes additional time and also results in dirty pots and pans and other utensils.

Geletin, rennet and junket type puddings can be prepared more readily than bread puddings but the result is a smooth jelly type pudding not at all resembling the taste or texture of a bread pudding. The pudding described herein is thick and dense and not at all similar to smooth jelly type puddings.

SUMMARY OF THE INVENTION

It is an object of this invention to provide a convenient method of preparing a pudding resembling a bread pudding.

It is also an object to provide a method requiring little skill and time for preparation.

It is a further object to provide a method which does not normally require the stirring of the ingredients.

It is a further object to provide a method in one form which does not require the use of a stove or oven.

It is a further object of this invention to provide a method for preparing a thick, hearty pudding resembling a bread pudding in taste and texture which can be prepared in less than one minute and requires less than one hour of setting time.

It is another object of this invention to provide a method that does not require baking, heating, or cooking.

It is also an object to provide modified method which produces a form of warm pudding resembling a Brown Betty.

Furthermore, it is another object to provide a pudding which is high in nutrients, low in calories, and appetite satisfying.

Certain common breakfast cereals can be crushed to produce a reduced flake size and then combined with readily available liquids such as milk and allowed to set to produce an unusual and surprising result of a tasty and nutritious food similar to bread pudding in texture and density. Furthermore, if the pudding is prepared with skimmed milk or water, the resulting desert is appetite satisfying yet low in calories. The ingredients are combined and then the mixture is left for approximately one hour at room or at refrigerator temperature before serving. Fruit and/or flavoring may be added to the pudding according to individual taste.

BRIEF DESCRIPTION OF PREFERRED EMBODIMENT

One of the main ingredients which may be used in the preparation of this pudding is a commonly available oat flake prepared with the following ingredients:

| Ingredient | Weight Percentage |
|---|---|
| Oat Flour | 60 – 70% |
| Rice Flour | 7 – 12% |
| Soy Flour | 5 – 10% |
| Sucrose | 5 – 15% |
| Lecithin | .05 – .15% |
| Salt | 2 – 4% |
| Milk Protein | 1½ – 3½% |

Suitable oat flakes are available under the brand name of Fortified Oat Flakes manufactured by the Post division of the General Foods Corporation and certain details of manufacture are described in U.S. Pat. Nos. 2,998,317 and 3,121,637 assigned to General Foods.

The preparation of the pudding is relatively simple and requires a minimum of utensils, ingredients, and skill. The proportion of ingredients used; however, is fairly critical and the preparation should only be attempted if some measuring means is available such as a kitchen measuring cup.

A single portion can be prepared as follows:

Approximately ⅔ cups of conventional oat flakes should be crushed so as to reduce the volume to half the original volume; i.e., to ⅓ cup. Then a small amount of dried fruits; such as ¼ ounce of raisons and/or flavoring, such as cinnamon, may be added if desired. The resulting mixture is then poured into a bowl. One quarter cup of liquid is then poured into said bowl or container. The liquids can be cream, whole milk, skimmed milk, water, fruit juice, or non-dairy substitute milk. No heating of the liquid is required and for greatest convenience may be at a temperature range of 5° to 20° centigrade. However, the pudding will also set if heated liquids are used; as would be the case when one desires to produce a hot pudding.

The texture of the pudding when made with a hot liquid is somewhat different than made with a cool liquid and may be preferred by some even when served cold. Of course, preparation with a heated liquid takes more time and is less convenient than preparation with an unheated liquid but is still considerably more convenient than normal bread pudding preparation.

The liquid should be carefully poured over the crushed cereal mixture making certain that the cereal is thoroughly moistened. The dry mixture may also be poured into the liquid but it is usually more convenient and best results are achieved if the liquid is poured into the dry mixture. The resulting mixture is then allowed to sit for at least 45 minutes before serving. It has been found that nuts, cinamon, and/or other flavorings, dried, canned or fresh fruits may be mixed into the mixture prior to setting.

The results are a critical function of the amount of liquid used. If too much liquid is used, the pudding will not properly set and the mixture will be soggy. If too little liquid is used the pudding will not set throughout and the top will be dry. I have found that the weight of the liquid should be approximately two times the weight of the dry mixture for best results. The pudding may be set at room temperature or more suitably set and stored in a refrigerator. If the pudding is to be served hot it should be prepared with a hot liquid and allowed to set at room or elevated temperature until served. The setting temperature of the mixture is not critical. I have found that a pleasant pudding resembling a "Brown Betty" can be prepared by adding thin slices of apples to the dry mixture and using just boiling milk some 45 minutes before serving and allowing the pudding to set at room temperature prior to serving. An unsweetened form of this pudding may be served hot with meat as a potato substitute.

One of the most important aspects of this invention is the size of the flakes used. There is a maximum flake size which should not be exceeded if satisfactory results are to be achieved. Common oat flakes generally have a degree of curvature; i.e., they are not perfectly flat. Therefore, the flakes will not pack very tightly when poured into a plate as the curvature of the flake requires space and the thus limits the packing density.

The larger the flake size the greater the looseness of packing. If the flakes used in preparing the pudding are too large they will not pack dense enough in the plate and therefore the liquid does not wet the top flakes properly. Thus, the top flakes are relatively dry and do not become part of the solid pudding mass. On the other hand, the flakes on the bottom are unable to absorb all the liquid and become saturated and soggy.

Conversely, the flakes should not be ground too fine (less than approximately .1 cm flake size) because when liquid is poured into the dry mixture a wet coating will be formed by the top layer and this coating will insulate other segments of the mixture from the liquid. In order to avoid dry pockets from resulting in the pudding appreciable time and effort is required to stir the mixture so that all portions of the dry mixture are wet, negating the ease of pudding preparation.

These problems can be avoided by properly preparing the flakes as described herein. One approach would be to produce the flakes so that they are very flat but sufficient space remains to insure wetting of all parts of the dry mixture.

The second approach to the problem would be to filter the flakes so that correct size flakes are selected for use in the production of the pudding. The larger flakes could be used for regular breakfast cereal food.

A third approach would be to crush normal flakes so as to produce the correct size of the flake. Normal flakes, as prepared for breakfast cereal use and described above and sold under the brand name of Fortified Oat Flakes have a length of some 2 to 3 centimeters. The proper length of flakes for use in pudding preparation should be less than one centimeter and more preferably from 0.1 to 0.7 centimeters.

In preparing samples of the pudding it has been found that the flakes can be prepared by crushing normal flakes to reduce the volume. The weight of ⅓ of a cup of properly prepared loosely packed flakes weighs from 0.8 to 2 ounces. (Loosely packed flakes as defined here are flakes that have been poured into a container without any added pressure exerted to increase the packing density.)

Since one-third of a cup of water weighs approximately 2.78 ounces the specific gravity (which may be defined as the ratio of the density of a substance to that of water) varies approximately 0.3 to approximately 0.7.

If it is desired to prepare a hot pudding, similar to a Brown Betty, the liquid used to make the pudding should be heated. Such a hot pudding may be produced by bringing milk to the boiling point and then pour the milk into the dry mixture and allow the mixture to set at room temperature for approximately one hour prior to serving. While the procedure is not as convenient as producing the unheated pudding it is much less difficult than baking a normal Brown Betty. Different fruits and flavoring can be used; such as apples, apricots, prunes, etc.

What is claimed is:

1. A method for producing a pudding similar in texture and density to bread pudding which comprises; mixing approximately one part weight of a dry mixture consisting essentially of oat flakes having a size between 0.1 and 0.7 cm and having a specific gravity of approximately 0.3 to approximately 0.7 with two parts weight of an edible liquid so as to wet said oat flakes and allowing the resulting mixture to set prior to serving.

2. The method, according to claim 1, wherein included in the mixing step is the adding of approximately ¼ parts weight of dried fruit.

3. The method, according to claim 1, wherein the said edible liquid is milk.

4. The method, according to claim 1, wherein the said edible liquid is water.

5. The method, according to claim 1, wherein the said edible liquid is non-dairy milk substitute.

6. The method, according to claim 1, wherein the said edible liquid is cream.

7. The method, according to claim 1, wherein the said edible liquid is skimmed milk.

8. The method, according to claim 1, wherein the said edible liquid is fruit juice.

9. The method, according to claim 1, wherein the mixture is allowed to set at least 45 minutes.

10. The method, according to claim 1, wherein the temperature of the liquid used in the preparation is from 5° to 20°C.

11. The method, according to claim 1, including the step of heating said edible liquid to the boiling state just prior to mixing the liquid with the dry mixture.

12. The method, according to claim 1, wherein said mixing step is pouring liquid and dry mixture into a common container.

13. The method, according to claim 1, wherein said mixing step includes adding flavoring.

14. The product produced by the method of claim 1.

* * * * *